United States Patent Office 3,375,076
Patented Mar. 26, 1968

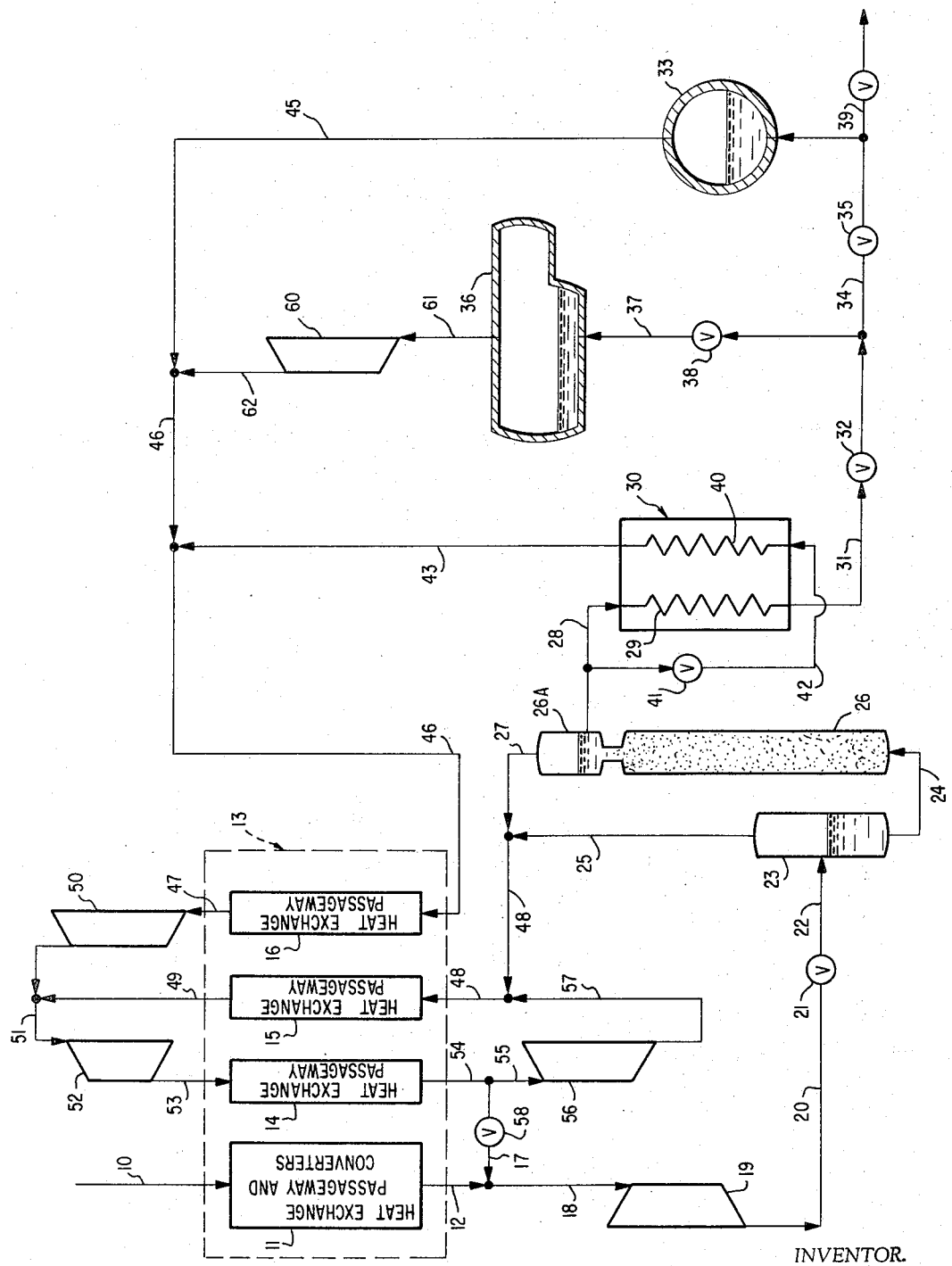

3,375,076
LIQUEFACTION AND CONVERSION PROCESS
Peter C. Vander Arend, Huntsville, Ala., assignor to Air Products and Chemicals, Inc., a corporation of Delaware
Filed Jan. 6, 1964, Ser. No. 335,906
6 Claims. (Cl. 23—210)

ABSTRACT OF THE DISCLOSURE

Process for producing liquid hydrogen of high para composition in which compressed hydrogen gas of normal equilibrium composition (75% ortho hydrogen-25% para hydrogen) is cooled by heat interchange with relatively cold fluid and passed in contact with a catalyst which accelerates conversion of ortho-hydrogen to para-hydrogen and in which the hydrogen gas is then expanded to a lower pressure to effect at least its partial liquefaction and the liquefied portion is separated and then catalytically converted to further increase its para composition.

This invention relates to the liquefaction of hydrogen and more particularly to methods of and apparatus for producing liquid hydrogen of high para composition.

It is an object of the present invention to provide a cycle for producing liquid hydrogen of high para composition in which the hydrogen undergoing liquefaction and conversion is expanded with production of external work.

Another object is to provide a cycle for producing liquid hydrogen of high para composition including a novel arrangement for providing subcooled converted liquid hydrogen product.

Still another object of the present invention is to provide a cycle for producing liquid hydrogen of high para composition including a novel arrangement for transferring converted liquid hydrogen with minimum loss of liquid product.

Other objects and features of the present invention will become apparent from the following detailed description considered in connection with the accompanying drawing which discloses a preferred embodiment of the invention. It is to be expressly understood, however, that the drawing is designed for purposes of illustration only and not as a definition of the limits of the invention, reference for the latter purpose being had to the appended claims.

The single figure of the drawing discloses a hydrogen liquefaction and conversion cycle embodying the principles of the present invention.

With reference to the drawing, hydrogen feed gas of normal composition and under a pressure such as 600 p.s.i.a. enters the cycle through conduit 10 for flow through device 11 including heat exchange passageways and ortho-hydrogen converters. The hydrogen feed gas leaves the device 11 through conduit 12 at a temperature of about −402° F. and of about 90% para composition. As indicated by the rectangle 13, the heat exchange passageways of the device 11 and the heat exchange passageways 14, 15 and 16 are in heat interchange relationship so as to obtain optimum heat interchange between the warm fluids entering the cycle and relatively cold fluids leaving the cycle. Also, the device 11 may include auxiliary sources of refrigeration, such as liquid nitrogen, to cool the compressed hydrogen feed. The compressed hydrogen feed in the conduit 12, together with a mass of hydrogen gas at the same pressure and substantially the same para composition merged therewith by way of conduit 17, as described below, is passed by conduit 18 to an expansion device 19 wherein the compressed hydrogen is expanded with production of external work to the lowest possible superatmospheric pressure without formation of liquid in the expansion device. Thus, the effluent from the expansion engine 19 will be at a pressure no greater than the critical pressure of hydrogen and preferably less than the critical pressure in view of the relatively low inlet temperature to the expansion engine. The effluent of the expansion engine is conducted by conduit 20 to a valve 21 whereby the pressure is reduced to a lower superatmospheric pressure, such as 50 p.s.i.a., for example, to effect partial liquefaction of the hydrogen feed. The feature of expanding the cool high pressure hydrogen feed gas in the work expansion engine 19 to the lowest permissible pressure without formation of liquid in the expansion engine followed by expansion in the valve 21 to a pressure within the liquefaction range makes it possible to obtain liquefaction of a greater portion of the hydrogen feed gas as compared to systems in which the expansion is achieved only by the use of a valve. This feature is of particular importance when used in combination with hydrogen liquefaction and conversion cycles since the portion of the hydrogen feed gas that does not go into the liquid phase represents a conversion as well as a liquefaction loss.

The partially liquefied hydrogen feed is conducted by conduit 22 to a phase separator 23 from which the liquefied portion is withdrawn through conduit 24 and the unliquefied portion is withdrawn by way of conduit 25. The liquefied hydrogen, at a temperature of about −414° F., is passed by the conduit 24 for flow through a converting device 26 including a suitable catalyst for accelerating conversion of ortho-hydrogen to para-hydrogen wherein the para composition of the liquid hydrogen is increased to about 95% or greater. The converting device 26 communicates with a phase separator 26A from which hydrogen vapor, or 95% para composition, resulting from the heat of conversion, is withdrawn through conduit 27, liquid hydrogen being withdrawn from the phase separator 26A through conduit 28 and passed thereby for flow through passageway 29 of a subcooling device 30. The hydrogen liquid under a pressure of about 50 p.s.i.a and of 95% para composition leaves the passageway 29 through conduit 31 at about −420° F. and then is passed to valve 32 whereat the pressure is further reduced to a value slightly in excess of atmospheric pressure, such as 18 p.s.i.a. The low pressure converted liquid hydrogen may be transferred to a storage vessel 33 by way of conduit 34 having a control valve 35 or to a mobile storage vessel such as liquid hydrogen trailer 36 through conduit 37 having a control valve 38. Also, converted liquid hydrogen may be transferred to the trailer 36 or withdrawn from the storage vessel 33 through valved conduit 39.

The hydrogen liquid of 95% para composition is subcooled to a temperature of about −420° F. upon flow through the passageway 29 in countercurrent heat interchange with relatively cold fluid flowing through passageway 40 of the subcooling device 30. The relatively cold fluid is obtained by flowing a relatively small portion of the hydrogen liquid from the conduit 28 through a valve 41 by which the pressure of the liquid hydrogen is reduced to a value slightly in excess of atmospheric pressure, such as 18 p.s.i.a. for example, and then fed by conduit 42 for flow through the passageway 40; the low pressure hydrogen leaves the passageway 40 through conduit 43 in vapor phase at about −422° F.

The hydrogen vapor in the conduit 43 of 95% para composition as well as hydrogen vapor withdrawn from the storage vessel 33 through conduit 45 of the same para composition are combined in conduit 46 and passed through heat exchange passageway 16 from which the hydrogen vapor is withdrawn through conduit 47 at about ambient temperature. In order to insure the outward flow from the cycle of the hydrogen vapor, the valve 41 is set to reduce the liquid hydrogen to a value sufficiently above atmospheric pressure, such as 18 p.s.i.a. as mentioned above, and the pressure within the storage vessel 33 is maintained at substantially the same relatively low superatmospheric pressure. The hydrogen vapor withdrawn from the phase separators 23 and 26A through conduits 25 and 27, respectively, are merged in conduit 48 and flowed through heat exchange passageway 15, such hydrogen vapor of between 90% and 95% para composition leaving the heat exchange passageway 15 through conduit 49 at about ambient temperature and under a pressure of about 50 p.s.i.a. The low pressure hydrogen gas in conduit 47 is compressed in compressor 50 to the intermediate pressure of the hydrogen gas in conduit 49 and the hydrogen gas from the compressor 50 is merged with the hydrogen gas in the conduit 49 and passed by conduit 51 to compressor 52 which raises the pressure of the combined hydrogen gas to correspond to the pressure of the hydrogen feed gas entering the cycle at conduit 10, i.e. about 600 p.s.i.a. for example. The high pressure hydrogen gas of between 90%–95% para composition discharged from the compressor 52 is passed by conduit 53 for flow through the heat exchange passageway 14 and leaves the latter heat exchange passageway through conduit 54 at about −402° F. A portion of the high para composition hydrogen gas in the conduit 54 is passed by the conduit 17 and merged with the hydrogen feed gas in conduit 12, as described above, while the remaining portion, which may be withdrawn from passageway 14 at liquid nitrogen temperature, is passed by conduit 55 to an expansion engine 56 wherein the hydrogen gas is expanded with work to a pressure corresponding to the intermediate pressure, i.e., about 56 p.s.i.a. The effluent from the expansion engine 56 is conducted by conduit 57 and conduit 48 for flow through the heat exchange passageway 15. The expansion engine 56 provides refrigeration for the process. The mass of high para hydrogen gas flowing through the conduit 17 may be controlled by a valve 58 such as to correspond substantially to the combined mass of hydrogen vapor in conduits 46 and 48.

When converted liquid hydrogen product is transferred to the trailer 36, whether directly from the cycle or from the storage vessel 33, it is necessary to introduce the liquid converted hydrogen into the trailer 36 at the lowest possible pressure in order to minimize the loss of converted liquid hydrogen product by vaporization. The present invention provides a novel arrangement for accomplishing this result while at the same time making it possible to recover the refrigeration of the converted liquid hydrogen that is vaporized as well as the energy expended in effecting its conversion. As shown, this arrangement includes a cold compressor 60 having its inlet connected by conduit 61 to the vapor space of the trailer 36 and its discharge connected by conduit 62 to the conduit 46. With this arrangement, the valve 38 is adjusted to reduce the pressure of the converted liquid hydrogen to a lower pressure, such as atmospheric pressure, and the compressor 60 functions to increase the pressure of the hydrogen vapor withdrawn from the vapor space of the trailer to slightly above atmospheric pressure, such as 18 p.s.i.a. for example, to cause the flow of such hydrogen vapor through the cycle with the hydrogen vapor in conduits 43 and 45 thereby recovering its refrigeration as well as the energy expended in effecting its conversion to 95% para composition. In some modes of operation such as during initial filling of a relatively warm trailer, it may be desirable to operate the compressor with its inlet under a subatmospheric pressure to cause the liquid converted hydrogen introduced into the trailer to boil at a corresponding lower temperature. This will result in more rapid cooling of the trailer and filling of the trailer with minimum loss of converted liquid hydrogen by vaporization.

The feature of effecting subcooling of the converted liquid hydrogen product by flowing relatively cold liquid hydrogen through the passageway 40 in heat interchange with the passageway 29 prevents the accumulation of impurities, particularly oxygen, in the subcooling device and thus eliminates a serious explosion hazard existing in prior subcooling arrangements in which converted liquid hydrogen product is flowed through a coil immersed in a pool of liquid hydrogen derived from the product and boiling under a lower pressure. Although absorption means are employed to remove oxygen and other impurities from the hydrogen feed, it is not possible to remove completely all traces of oxygen and the oygen will accumulate in the pool of low pressure liquid hydrogen and build up to a value presenting a serious explosion hazard. Liquid hydrogen could be intermittently or continuously withdrawn from the pool of low pressure liquid hydrogen with the view toward maintaining the oxygen concentration in the pool of low pressure liquid hydrogen within safe limits; however, such performance would not assure absolutely the obtaining and maintaining of safe operating conditions and would result in the loss of the energy expended to liquefy and convert the liquid hydrogen so withdrawn unless apparatus is provided to recover the refrigeration of the withdrawn liquid and to return the resulting vapor to the liquefaction and conversion process. The feature of the present invention of effecting the subcooling by the continuous flow of low pressure liquid hydrogen through a passageway in heat interchange with the converted liquid hydrogen product prevents the accumulation of oxygen or other impurities in the subcooling device and obtains recovery of the energy of the subcooling low pressure converted liquid hydrogen without employing additional equipment other than the heat exchange passageway 40 which replaces the means in prior subcooling devices for maintaining the pool of low pressure converted liquid hydrogen. It is to be understood that the passageways 29 and 40 of the subcooling device 30 may be in physical contact with each other throughout their respective lengths and joined together or otherwise positioned to obtain optimum heat interchange therebetween.

It will thus be apparent that the present invention provides a novel hydrogen liquefaction and conversion cycle which reduces power requirements by employing the combination of work expansion and valve expansion of the hydrogen feed gas prior to the final conversion step, an arrangement which makes it possible to transfer converted liquid hydrogen product with minimum vapor loss, and a novel arrangement for effecting subcooling of the converted liquid hydrogen product which eliminates explosion hazards and makes it possible to recover energy of the low pressure converted liquid hydrogen employed to effect the subcooling step.

Although only one embodiment of the present invention has been disclosed and described herein, it is to be expressly understood that various changes and substitutions may be made therein without departing from the spirit of the invention as well understood by those skilled in the art. Reference therefor will be had to the appended claims for a definition of the limits of the invention.

What is claimed is:
1. Process for producing liquid hydrogen of high para composition which comprises
    passing compressed hydrogen feed in countercurrent heat interchange with relatively cold fluid and catalytically converting ortho-hydrogen to para-hydrogen to provide high para composition hydrogen feed at a relatively low temperature,
    expanding high para composition hydrogen feed to a lower superatmospheric pressure to effect partial liquefaction of the high para composition hydrogen feed, separating high para composition liquid hydrogen from high para composition unliquefied hydrogen, catalytically treating high para composition liquid hydrogen to increase further the para composition of the liquefied hydrogen, and thereafter subcooling liquid hydrogen of increased para composition by passing liquid hydrogen of increased para composition through a first heat exchange passageway in countercurrent heat interchange with relatively cold converted liquid hydrogen flowing through a second heat exchange passageway in heat exchange relation with the first passageway.

2. Process for producing liquid hydrogen of high para composition as defined in claim 1 in which the relatively cold converted liquid hydrogen comprises a portion of the liquid hydrogen of increased para composition under lower superatmospheric pressure.

3. Process for producing liquid hydrogen of high para composition as defined in claim 2 in which the portion of liquid hydrogen of increased para composition following the subcooling step is passed in countercurrent heat interchange with relatively warm compressed hydrogen gas and then compressed at ambient temperature to a relatively high pressure and used to provide a portion of the compressed hydrogen gas.

4. Process for producing liquid hydrogen of high para composition which comprises passing compressed hydrogen feed in countercurrent heat interchange with relatively cold fluid and catalytically converting ortho-hydrogen to para-hydrogen to provide high para composition hydrogen feed at a relatively low temperature, expanding high para composition hydrogen feed to a lower superatmospheric pressure to effect partial liquefaction of the high para composition hydrogen feed, separating high para compostiion liquid hydrogen from high para composition unliquefied hydrogen, catalytically treating high para composition liquid hydrogen to increase further the para composition of the liquefied hydrogen, subcooling liquid hydrogen of increased para composition, expanding subcooled liquid hydrogen to a still lower superatmospheric pressure, transferring expanded liquid hydrogen of increased para composition to a liquid receiving vessel under a pressure not greater than atmospheric pressure, withdrawing vapor from the vessel during the transferring step, compressing withdrawn vapor to a pressure in excess of atmospheric pressure, passing compressed withdrawn vapor in countercurrent heat exchange with relatively warm compressed hydrogen gas to warm compressed withdrawn vapor, and compressing warm withdrawn vapor to a relatively high pressure to provide a portion of the compressed hydrogen gas.

5. Process for producing liquid hydrogen of high para composition which comprises passing compressed hydrogen feed in countercurrent heat interchange with relatively cold fluid and catalytically converting ortho-hydrogen to para-hydrogen to provide high para composition hydrogen feed at a relatively low temperature, expanding high para composition hydrogen feed to a lower superatmospheric pressure to effect partial liquefaction of the high para composition hydrogen feed, separating high para composition liquid hydrogen from high para composition unliquefied hydrogen, catalytically treating high para composition liquid hydrogen to increase further the para composition of the liquefied hydrogen, subcooling liquid hydrogen of increased para composition by passing liquid hydrogen of increased para composition through a first heat exchange passageway in countercurrent heat interchange with a minor portion of liquid hydrogen of increased para composition under a lower superatmospheric pressure.

transferring subcooled liquid hydrogen to a liquid receiving vessel under a pressure not greater than atmospheric pressure, withdrawing cold vapor from the vessel, compressing withdrawn cold vapor to the lower superatmospheric pressure, passing compressed cold vapor and the portion of liquid hydrogen of increased para composition vaporized by the subcooling step in countercurrent heat interchange with relatively warm compressed hydrogen gas to warm the withdrawn vapor and the vaporized portion, and compressing warm withdrawn vapor and warm vaporized portion to a relatively high pressure to provide a portion of the compressed hydrogen gas.

6. Process for producing liquid hydrogen of high para composition as defined in claim 5 in which the high para composition hydrogen feed is expanded with the production of external work to a lower superatmospheric pressure and the effluent of the work expansion step is expanded in a valve to a lower superatmospheric pressure to effect partial liquefaction of the high para composition hydrogen feed.

References Cited

UNITED STATES PATENTS

| | | | |
|---|---|---|---|
| 2,937,076 | 5/1960 | Class et al. | 23—210 |
| 3,092,461 | 6/1963 | Vander Arend et al. | 23—210 |
| 3,095,274 | 6/1963 | Crawford | 23—210 |
| 3,116,115 | 12/1963 | Kasparian et al. | 23—210 |

FOREIGN PATENTS 145,251      1962    Russia.

OSCAR R. VERTIZ, *Primary Examiner.*

EDWARD STERN, *Examiner.*